United States Patent
Das et al.

(10) Patent No.: US 10,140,559 B1
(45) Date of Patent: Nov. 27, 2018

(54) METHODS AND SYSTEMS FOR CREATING RASTER IMAGE FOR CLEAR OBJECTS ON CLEAR PLANE

(71) Applicant: XEROX CORPORATION, Norwalk, CT (US)

(72) Inventors: Arindam Das, Konnagar (IN); Karthik Jakkala, Hyderabad (IN); Polisettyvrk Jyothendravarma, Vijayawada (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/795,325

(22) Filed: Oct. 27, 2017

(51) Int. Cl.
G06K 15/02 (2006.01)

(52) U.S. Cl.
CPC ..... *G06K 15/1874* (2013.01); *G06K 15/1807* (2013.01); *G06K 15/1817* (2013.01); *G06K 15/1822* (2013.01); *G06K 15/1836* (2013.01); *G06K 15/1882* (2013.01)

(58) Field of Classification Search
None
See application file for complete search history.

(56) References Cited

U.S. PATENT DOCUMENTS

| | | | |
|---|---|---|---|
| 7,965,409 B2* | 6/2011 | Lin | G06K 15/02 358/1.2 |
| 8,175,384 B1* | 5/2012 | Wang | G06T 7/194 348/586 |
| 2015/0070371 A1* | 3/2015 | Poddar | G06T 1/60 345/552 |

* cited by examiner

*Primary Examiner* — Pawandeep Dhingra

(57) ABSTRACT

Methods and systems for printing clear tagged objects on clear plane are described herein. In an example, the system draws a bounding box for each block of text/graphic objects. Within each bounding box, an occupancy percentage of foreground pixels (tagged as clear objects) is computed against background pixels. If the computed occupancy percentage falls below a defined threshold value, then that text/graphic object is considered for application of dilation. Thus, the device described herein doesn't check the size of the text/graphic objects; rather checks for the occupancy percentage of the text/graphic objects within a bounding box. While constructing the clear plane to support flood clear, the clear values corresponding to the dilated pixels (pixels considered for dilation) will be intelligently modified. In this way, only intended and logically desired text/graphic objects undergo for dilation.

27 Claims, 10 Drawing Sheets

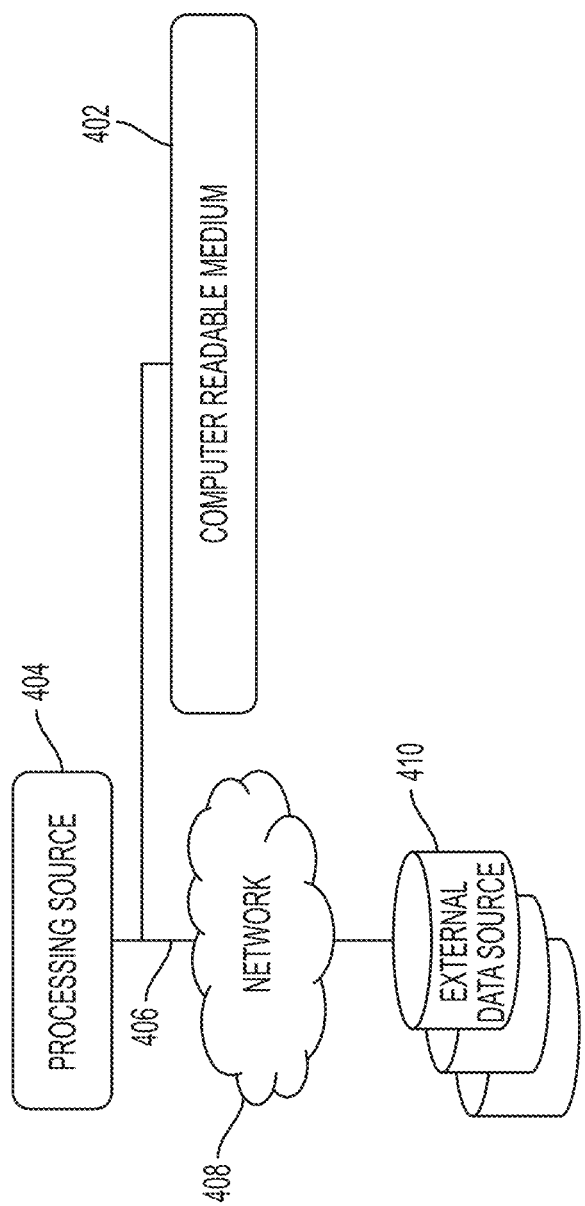

METHODS AND SYSTEMS FOR CREATING RASTER IMAGE FOR CLEAR OBJECTS ON CLEAR PLANE

TECHNICAL FIELD

The present subject matter relates generally to image rendering systems (printers for example) and more particularly to a method and a system for creating raster image for clear objects on clear plane.

BACKGROUND

Printing systems or printers are used to facilitate the printing of hard copies, of electronic documents stored or prepared on user devices, for personal, business, or administrative purposes. Examples of user devices may include workstations, personal computers, personal digital assistants (PDAs), laptop computers, notebooks, smart phones, and the like. The printers can directly communicate with the user devices, or can communicate with the user devices over a network.

Generally, a user can submit a print job to the printer in the form of page description language (PDL) file from any of the user devices connected to the network. The print job can be submitted either by using a printer driver or by using a driverless web-based platform. The printer driver is normally associated with only one printer; however, the web-based platform is normally associated with all the printers connected to the network.

At the printer, a raster image processor (RIP) receives the PDL file having an input image. In an example, the input image may include one or more objects such as characters, words, text, and other objects such as graphics, images, etc. The PDL file received at the RIP includes rendering information describing the layout of the input image as it was created on the user device used by the user. Also, the RIP makes the decision on how to process the input image based on the rendering instructions stored in the PDL file. On the basis of the decision, the RIP converts the input image from their form in the PDL file to a sequence of serial instructions for the printer in a process commonly known as "ripping" and provides a ripped image to an image storage-and-retrieval system known as a print engine. The print engine converts the ripped image into a ready-to-print (RTP) format and makes it available to the printer for printing the input image.

However, while the making the input image available to the printer, the user of the user device is provided with limited option of enhancing the color or image quality of the input image. For example, the user is generally provided with options of selecting settings such as lighting/darkening of the input image with reference to background. In this relation, various efforts regarding printers or printing system have been made in past for continuing developments to improve the image quality. One of such effort includes implementation of the various quality enhancement operations on the objects present in the input image for image quality enhancement. For example, for enhancing the quality of the input image, the enhancement operations enable the user for selecting object clear for an image (not tagged as clear in PDL) followed with the selection of flood clear for that image. With such selections, the image will be rendered using cyan, magenta, yellow, and black (CMYK) profile with clear plane in addition. This is because the image was not tagged as clear in the PDL so obviously it will assume CMYK value. However, in such efforts, the objects (text/graphics) that are tagged as clear objects become invisible in case the user applies flood clear on the object tagged as clear in the PDL. Flood clear is a feature of printing systems in which the entire page or area on an input image has clear ink effect. Thus, when the user selects the application of the flood clear feature on the object tagged as clear in the PDL, the printer or the printing system facilitates by default the highest precedence to the flood clear, so that the said object tagged as clear will have only clear value and no CMYK value, as the object is tagged as clear in the PDL, and as the amount selected for flood and the same amount of clear will be applied throughout the plane. Because of such precedence of the application of the flood clear over the object clear, the object tagged as clear in the PDL goes invisible.

Accordingly, there is a need for having a technique to modify the values of the pixels associated with clear objects so that the clear objects can be visualized by human eyes even after the application of the flood clear.

SUMMARY

According to aspects illustrated herein, a method for printing clear tagged objects on clear plane is disclosed, the method being implemented in a multifunctional device (MFD). The MFD may include a processor, a digital front end (DFE) module coupled to the processor, and a digital rear end (DRE) module coupled to the processor. The method includes receiving a print job comprising a PDL file including an input image. Upon receipt, raster image processing is performed on the input image to generate input raster buffer by converting the input image into a digital bitmap image comprised of an array of pixels, wherein each pixel being assigned with an object tag information and an object definition. The object tag information indicates type of an object in the input image, and the object definition from the PDL file provides information that whether an object is defined as a clear object in the PDL file. Based on the object tag information and the object definition present in the PDL file, clear objects are determined. Then, a bounding box is drawn around each block of the clear objects. Once the bounding box is drawn, pixels tagged as clear in the bounding box are considered as foreground pixels and rest pixels in the same bounding box are considered as background pixels. For each bounding box, occupancy percentage of the foreground pixels against the background pixels is computed. In case the computed occupancy percentage is below a threshold value, dilation is performed on the foreground pixels representing the clear objects. After dilation, the pixels which are dilated as dilated pixels are tagged. Thereafter, an amount of flood clear is determined, selected for the application on the input image. For each of the dilated pixels and based on the amount of the flood clear, pixel values of the dilated pixels are modified to bring the dilated pixels in the range of visibility of clear ink value. Thereafter, the input raster buffer is converted into a ready-to-print (RTP) format, and the print document is generated at the MFD based on the RTP format.

According to other aspects illustrated herein, a multifunctional device (MFD) for printing clear tagged objects on clear plane is disclosed. The MFD includes a processor, a digital front end (DFE) module coupled to the processor, and a digital rear end (DRE) module coupled to the processor. The DFE module receives a print job comprising a PDL file including an input image. Upon receipt, the DFE module performs raster image processing on the input image to generate input raster buffer by converting the input image into a digital bitmap image comprised of an array of pixels, wherein each pixel being assigned with an object tag information and an object definition. The object tag information indicates type of an object in the input image, and the object definition from the PDL file provides information that whether an object is defined as a clear object in the PDL file. Based on the object definition, the DFE module determines the clear objects, and draws a bounding box around each block of the clear objects. Once the bounding box is drawn, pixels tagged as clear in the bounding box are considered as foreground pixels and rest pixels in the same bounding box are considered as background pixels. For each bounding box, the DFE module computes occupancy percentage of the foreground pixels against the background pixels. In case the computed occupancy percentage is below a threshold value, the DFE module performs dilation on the foreground pixels representing the clear objects. After dilation, the DFE module tags the foreground pixels representing the clear objects as dilated pixels of the clear objects. Thereafter, the DFE module determines an amount of flood clear selected for the application on the input image. For each of the dilated pixels and based on the amount of the flood clear, the DFE module modifies pixel values of the dilated pixels to bring the dilated pixels in the range of visibility of clear ink value. Thereafter, the DRE module converts the input raster buffer into a ready-to-print (RTP) format, and generates the print document at the MFD based on the RTP format.

According to additional aspects illustrated herein, a non-transitory computer-readable medium implementing the subject matter may include instructions executable by a processing resource. The instructions are executed to receive a print job at a multifunctional device (MFD). In an example, the print job comprising a PDL file including an input image. Upon receipt, raster image processing is performed on the input image to generate input raster buffer by converting the input image into a digital bitmap image comprised of an array of pixels, wherein each pixel being assigned with an object tag information and an object definition. The object tag information indicates type of an object in the input image, and the object definition from the PDL file provides information that whether an object is defined as a clear object in the PDL file. Based on the object definition, the DFE module determines the clear objects, and draws a bounding box around each block of the clear objects. Once the bounding box is drawn, pixels tagged as clear in the bounding box are considered as foreground pixels and rest pixels in the same bounding box are considered as background pixels. For each bounding box, occupancy percentage of the foreground pixels is computed against the background pixels. In case the computed occupancy percentage is below a threshold value, the foreground pixels are dilated. After dilation, pixels that are dilated as dilated pixels are tagged. Thereafter, an amount of flood clear selected for the application on the input image is determined. For each of the dilated pixels and based on the amount of the flood clear, pixel values of the dilated pixels of the clear objects in the input raster buffer are modified to bring the dilated pixels in the range of visibility of clear ink value. Thereafter, the input raster buffer is converted into a ready-to-print (RTP) format, and a print document is generated at the MFD based on the RTP format.

Other and further aspects and features of the present subject matter will be evident from the following detailed description of the exemplary implementations, which are intended to illustrate, not limit, the present subject matter.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 4 illustrates a network environment for implementing the present subject matter, according to an implementation of the present subject matter.

DESCRIPTION

Figure 1:
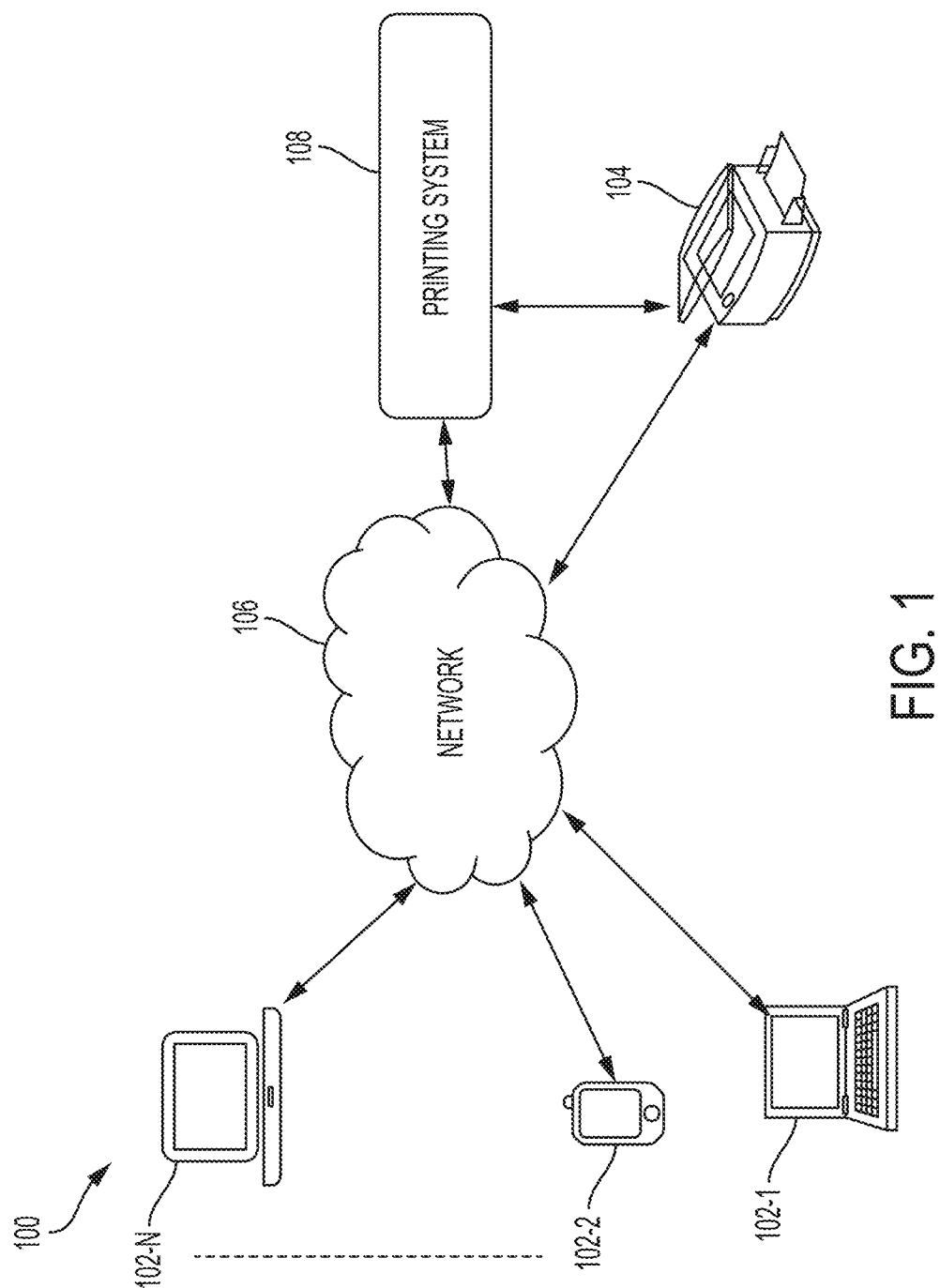
FIG. 1 illustrates a schematic network printing environment for network printing, according to an implementation of the present subject matter.

A few aspects of the present subject matter are explained in detail below with reference to the various figures. Example implementations are described to illustrate the disclosed subject matter, not to limit its scope, which is defined by the claims. Those of ordinary skill in the art will recognize a number of equivalent variations of the various features provided in the description that follows.

Non-Limiting Definitions

In the disclosure herein after, one or more terms are used to describe various aspects of the present subject matter. For better understanding of the subject matter, a few definitions are provided herein for better understating of the present disclosure.

"Input image" refers to a pattern of physical light captured or generated at a user device including workstations, personal computers, personal digital assistants (PDAs), laptop computers, notebooks, smart phones, and the like. The input image may include fill objects such as characters, words, text, and other objects such as graphics, images, etc. The input image may be included in a set of one or more input images, such as in input images of the pages of a document.

"Clear ink toner" is a clear ink that is used to highlight or bring glossiness to selected objects or entire input image. In case the clear image is applied to an image or text, then in the raster image, whenever these image or text appear, pixels of these image or text become eligible to get the clear ink applied during the printing. Also, the clear ink is separate ink from cyan, magenta, yellow, and black ink and is applied on the input image to enhance the print quality by adding additional gloss to print outs.

"Flood clear" is a feature of printing systems in which the entire page or area on an input image has clear ink effect.

"Printing system or print server" may be defined as including, but not necessarily limited to, a computing device, program, or combination thereof that processes requests, delivers data or other information, or provides one or more services over the cloud and/or a local network.

"Client device or user device" is defined as including, but not necessarily limited to, hardware, software, or a combination thereof that accesses a server. Examples include, but are not limited to, a computing device, a phone, a tablet, a personal digital assistant, or a server.

"Printer" may be defined as including, but not necessarily limited to, a peripheral that produces a representation of a document on one or both sides of media such as paper, transparency, fabric, etc. A printer can be single function device or multi-functional (e.g., including scanning, faxing, or other functionality) device. The multi-functional device may include software, hardware, firmware, or combination thereof. Further, the printer can use any of a variety of different types of marking technologies such as laser, inkjet, dye-sublimation, off-set printing, thermal printing, impact, etc. As used herein, the terms "render" and "rendering" are defined as including, but not necessarily limited to, taking print data such as text, images, graphics, etc. and converting them into a ready to print (RTP) format that is compatible with a destination printer.

"Computer-readable medium" or "storage medium" may be a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data would together be storage medium.

Overview

Several attempts have been made in the past to cater the emerging requirement of image quality enhancement. One such attempt focuses on text/graphics objects enhancements that are tagged as clear. Nowadays, as discussed above, when objects are tagged or selected as clear objects in the PDL and flood clear is applied over the said tagged clear objects, then for obvious reasons the text/graphics objects tagged as clear objects becomes invisible. Flood clear is a feature of printing systems in which the entire page or area on an input image has clear ink effect. Thus, when the user selects the application of the flood clear feature on the object tagged as clear in the PDL, the printer or the printing system facilitates by default the highest precedence to the flood clear, so that the said object tagged as clear will have only clear value and no CMYK value, as the object is tagged as clear in the PDL, and as the amount selected for flood and the same amount of clear will be applied throughout the plane. Because of such precedence of the application of the flood clear over the object clear, the object tagged as clear in the PDL goes invisible.

To this end, the present disclosure provides a method of dilation for creating a raster image for clear objects on clear plane. Generally, a predefined range of size is considered to decide whether a particular text/graphic is to be dilated or not. In case a text size doesn't fall under this predefined range, then that text doesn't get dilated. The reason for such condition is that in the existing techniques it is assumed that bigger the size better the visibility. But, in the existing techniques, it was never considered that even a much bigger text or graphic may have considerably very less foreground occupancy and because of which the bigger text were also not better visible with the implementation of the existing techniques. To resolve the issue, the subject method disclosed herein describes that, while performing flattening of the text over the underlying plane, the dilation method proposed herein first identifies the objects depending upon object tag information from a given raster. In an example, the object tag information indicates the object types. Thereafter, based on object definition from a PDL file of a print job, it is identified that whether any object is defined as a clear object. In case an object is defined as the clear object, each block of texts/graphics of the identified clear objects are then enclosed in a given bounding box. Now within each bounding box, the occupancy percentage of foreground pixels against background pixels is computed. If the computed occupancy percentage falls below a predefined value of, say 15, then the same texts/graphics of the identified clear objects are considered for application of dilation. In other words, the dilation method described herein doesn't check the size of the texts/graphics of the identified objects; rather the dilation method checks the occupancy percentage of the object content within a given bounding box. With such dilation method, the intended and logically desired components of the clear objects undergo for dilation and the visibility of the clear objects is enhanced, for example, during the application of flood clear.

Exemplary Implementations

The following disclosure explains a mechanism where a printing system with some hardware and software enhancements, is enabled to facilitate a user of a user device (or client device) to allow configuring of thickness of an interior region of a fill object in order to support image quality enhancements. Such printing system is further described with reference to FIGS. 1, 2, 3A-3H, 4 and 5A-5B.

It should be noted that that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

FIG. 1 illustrates, as an example, a printing environment 100 for printing of electronic documents, according to an example of the present subject matter. The printing environment 100 includes a plurality of user devices 102-1, 102-2, 102-N, hereinafter collectively referred to as user devices 102 and individually as user device 102. Examples of the user devices 102 may include, but are not limited to, workstations, personal computers, personal digital assistants (PDAs), laptop computers, notebooks, smart phones, smart cameras, smart television sets, and other smart devices.

Further, the printing environment 100 can include a plurality of printers out of which one printer 104 is shown for the sake of simplicity. In an example, the printer 104 and the user devices 102 are connected directly over a network 106 or through a printing system 108 over the network 106. In an example, the printing system 108 may be a print server, a network server, a web server, or a data server.

The network 106 may be a single network or a combination of multiple networks. The network 106 may include one or more area networks, such as a local area network (LAN), a wide area network (WAN), an intranet, the internet, or any other type of network. In an example, the network 106 may include mobile communication network, for example, 2G, 3G or 4G mobile communication network.

In an example, a user of the user device 102-2 logins to a printing service. The printing service can be offered directly by the printer 104 or the printing system 108 coupled to the printer 104-2. The user can login from the user device 102-2 present anywhere in the network 106, for submission of a print job to the printing service. Further, for submission of the print job, the user device 102-2 can facilitate the user to access a (web) portal of the printing service. In an example, the user may access the portal by selecting a print command for printing an input image. In another example, the user may access the portal by directly entering a URL address of the portal in a (web) browser. In yet another example, the user may access the portal using other (web) elements, such as widgets, and web enabled applications. Further, the portal may present a user interface, such as a print dialogue box, or a graphical user interface (GUI). The user interface allows the user to select the application of object clear feature, flood clear feature, or both. The user can also define the application of the object clear feature and flood clear feature at page description language (PDL) level.

For the printing service, the print job from the user device 102-2 is received either by the printing system 108 or the printer 104, based on the user's selection. The print job is received in the form of page description language (PDL) file such as PostScript (PS), Portable Document Format (PDF) and Extensible Markup Language (XML) Paper Specification (XPS). The PDL file may include information about various objects, say, characters, words, text, graphics, images, and the like, contained in the input image present in the PDL file. The information may describe the appearance of the fill objects present within the input image, and may include a set of programming language commands for processing the input image based on the information. In one example, the PDL file may include object definition defining the objects as clear objects based on user selection and general information on how to process the input image based on the clear object defined in PDL file.

Figure 3A:
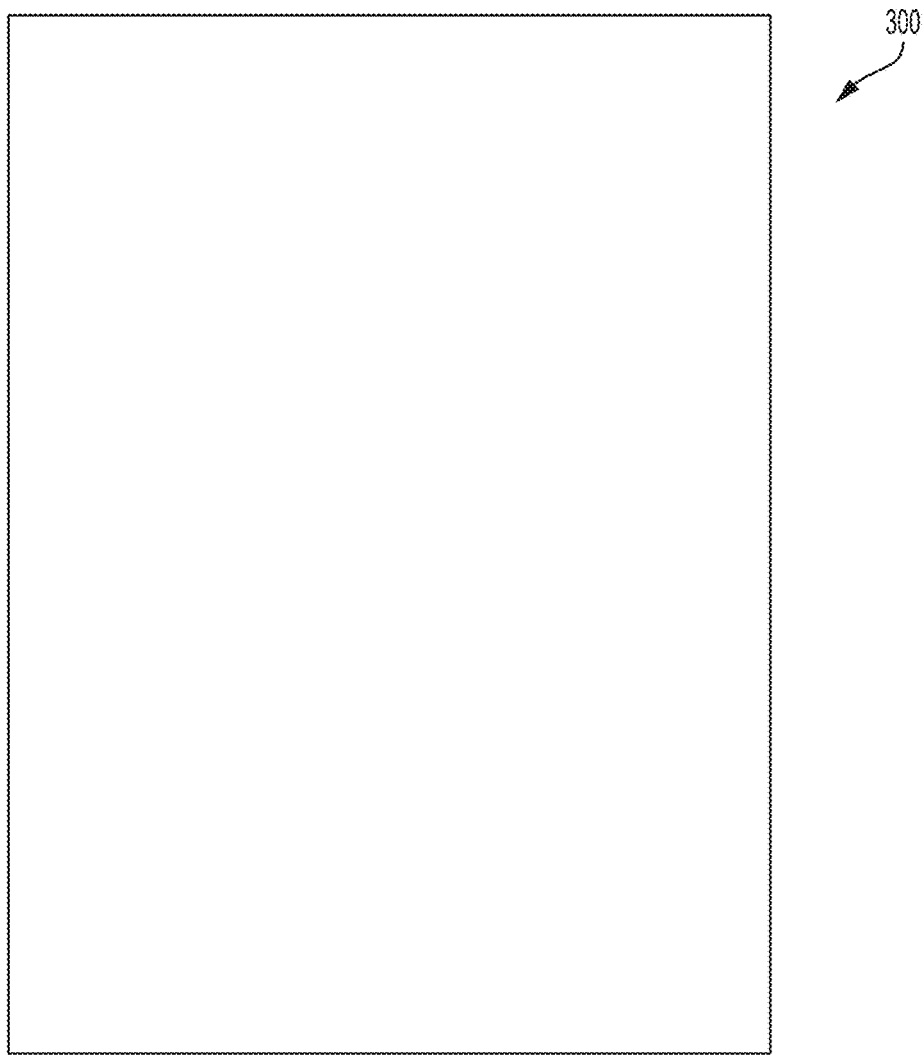
FIGS. 3A-3H illustrate comparison of print outputs of existing systems and the system according to an implementation of the present subject matter.
Figure 3B:
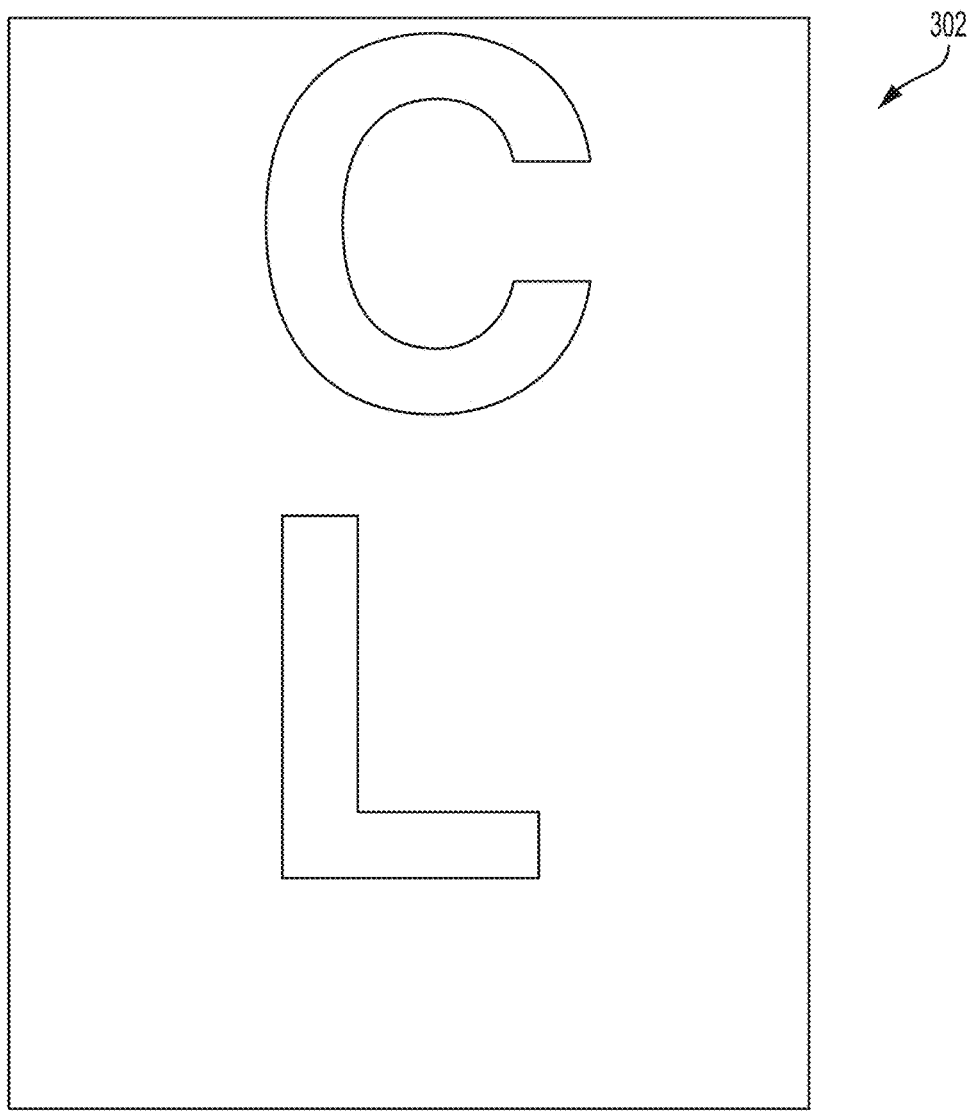
Figure 3D:
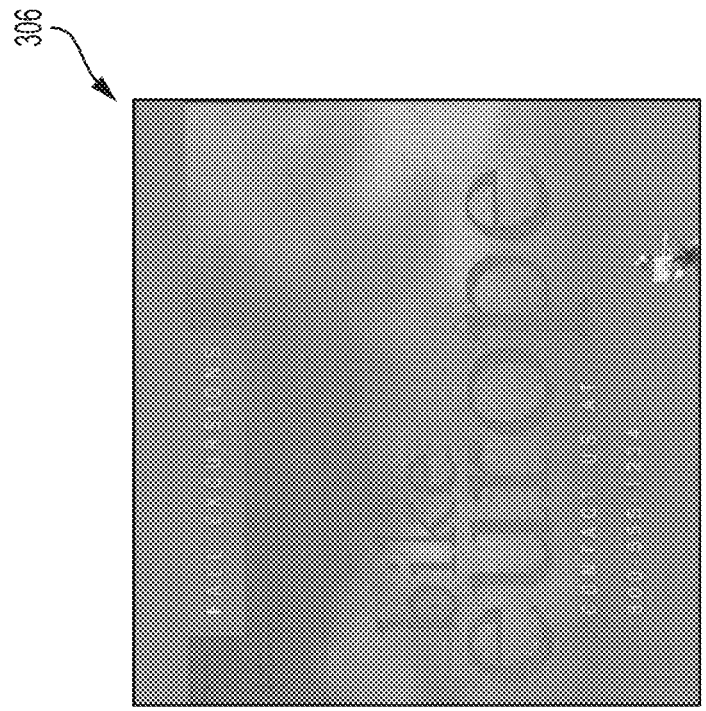
Figure 3C:
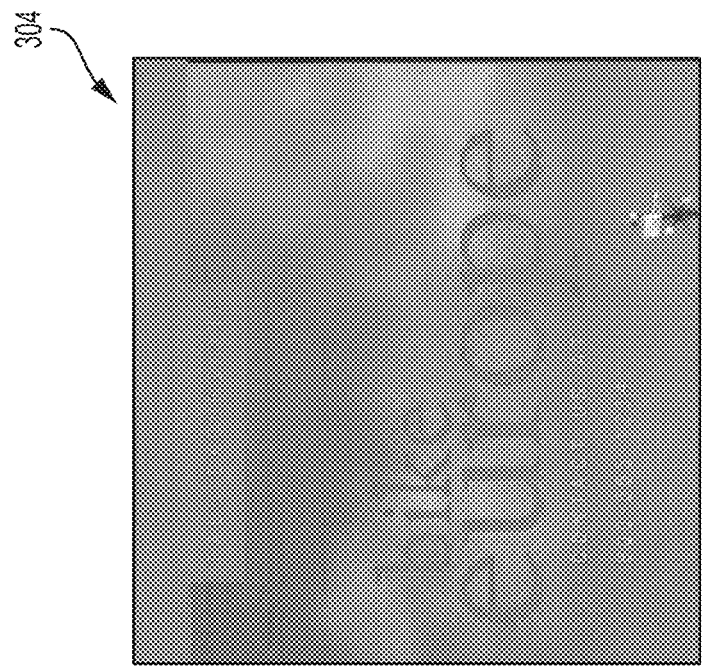
Figure 3E:
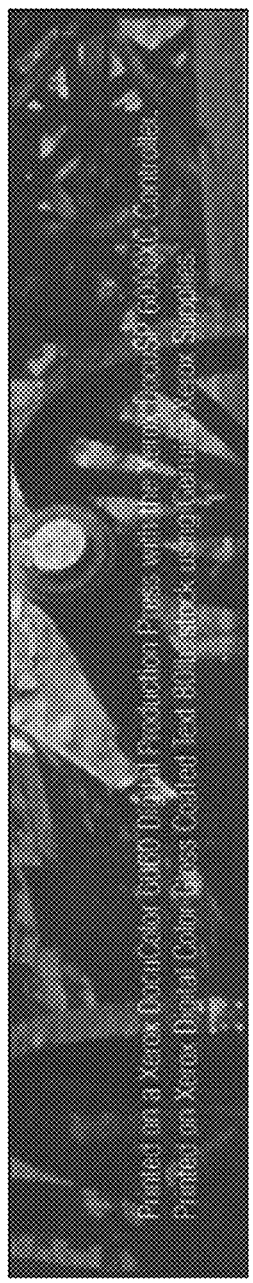

Further, based on the commands and information present or stored in the PDL file, the printer 104 or the printing system 108 decomposes the PDL file to determine whether any object in the input image is selected or defined by a user for application of object clear in the PDL, followed by determining whether flood clear feature is also selected by the user. In case both the object clear feature and the flood clear feature are determined to be selected by the user, the said object tagged as clear will have only clear value and no CMYK value as the object is tagged as clear in the PDL, because the amount selected for flood and the same amount of clear will be applied throughout the plane. Because of such precedence of the application of the flood clear over the object clear, the object tagged as clear in the PDL goes invisible, as shown in FIGS. 3A, 3C, 3E, 3G. For example, in FIG. 3A, an output 300 of the existing techniques of flood clear applications is shown. In the output 300, characters 'L' and 'C' are designed with clear ink in PDL, both characters become invisible when applied with flood clear. Similarly, in FIG. 3C, an output 304 of the existing techniques of flood clear applications is shown. In the output 304, the small size text objects fade away in the background pixels and are not clearly visible. FIG. 3E represents another output 308 of the existing techniques of flood clear applications. In the output 308, the text objects become blur and are not clearly visible. Further, FIG. 3G shows another output 312 of the existing techniques of flood clear applications. In the output 312, the text objects become blur or fade away in the background pixels and are not clearly visible.

In order to overcome this issue associated with the application the flood clear feature, the printing system 108 or the printer 104 performs raster image processing on the input image present in the PDL file. The raster image processing is a process of converting the input image into one or more digital bitmap images, rasterizing pixel data of the bitmap images into pixel values, and arranging the pixel values in an input raster buffer in raster format. Example of the raster format may include, but not limited to, JPEG, TIFF, RAW, PNG, GIF, BMP, PPM, PGM, PBM, XBM, ILBM, WBMP, and PNM.

In an example, each pixel comprised in the digital bitmap image is assigned with object tag information and an object definition. For example, the object tag information may determine or define an object type associated with a particular pixel. Examples of the object types may include text, image, or graphics. Further, the object definition from the PDL file defines which object types are selected by the user as the clear objects.

Based on the object tag information and the object definition, the printer 104 or the printing system 108 determines objects tagged as clear or clear objects. Thereafter, a bounding box is drawn around each block of the clear objects. In an example, the bounding box is a smallest square or rectangular box in which a group of the texts or characters can be accumulated.

Once the bounding box is drawn, pixels tagged as clear in the bounding box are considered as foreground pixels and rest pixels in the same bounding box are considered as background pixels. For each bounding box, the occupancy percentage of the foreground pixels is computed against the background pixels. If the computed occupancy percentage of a single bounding box falls below a threshold value, then the clear objects, representing text or graphic, is considered for application of dilation morphological operation. In an example, the threshold value associated with occupancy percentage is generally taken as 15; however, the user can adjust or modify this threshold value at the time of submission of the print job in the PDL file.

Once the clear objects are considered for dilation, the clear objects are subjected to the dilation morphological operation. In dilation morphological operation, the selected clear objects are made bigger, wider, larger, or more open. After application of the dilation morphological operation, the pixels associated with the clear objects are assigned with a different tag of "dilated pixels" of the clear objects.

In an alternate example, in case the computed occupancy percentage falls below the threshold value during determination of application of dilation, then the extreme and the second extreme edge pixels of the clear objects are considered as the "dilated pixels" of the clear objects.

Once the pixels in the clear objects are tagged or considered as the "dilated pixels," an amount of clear flood percentage applied on the input image is determined, followed by determination of an amount of the clear for the clear objects. Based on the determination of the amount of clear flood percentage and the amount of the clear, the following algorithms are performed to enhance the quality of the underlying clear objects in the input image:

Flood is the amount of flood percentage;
ObjectClearText is the amount of clear for clear object text;
tempC=0; Flag=false;
[Case 1]: When the Amount of Clear Flood Percentage is Equal to the Amount of the Clear for Clear Object Text
If Flood==ObjectClearText then
  Loop
    If ObjectClearText<=K||tempC<=P
      ObjectClearText=K1+ObjectClearText;
      tempC=ABS|Flood−ObjectClearText|
    Else
      Flag=true
      Break;
    EndIf
  EndLoop
  Loop Check (!Flag)
    If ObjectClearText>=K||tempC<P
      ObjectClearText=K1−ObjectClearText;
      tempC=ABS|Flood−ObjectClearText|
    Else
      Break;
    EndIf
  EndLoop
EndIf In an example, in the above provided algorithm, P is a constant threshold representing the clear ink value. The constant threshold P has a range of visibility of clear ink value between 0.3 and 0.7. In present example, the value of constant threshold P has been set as 0.3. Further, as described above, for each bounding box, the occupancy of the foreground pixels against background pixels is computed from each roster plane. If the computed occupancy percentage of a single bounding box falls below a threshold value K, then the same clear text object is considered to apply dilation, otherwise dilation will be skipped. In the present example, the threshold value K has been set as 15. This means if any bounding box has the occupancy of foreground pixels against background less than 15%, then the corresponding clear text object or part of the clear text object will undergo the dilation strategy. However, the value of this threshold K can be controlled by an application user.

Thus, when the amount of the clear flood percentage is equal to the amount of the clear for the clear object text, it is further determined that whether the clear object text has a threshold value K of less than or equal to 15%, or whether the clear object text is having clear ink value less than the constant threshold P. Based on such determination, the pixel values K1 of the dilated pixels of the clear object texts in the input raster buffer are modified by either increasing pixel values K1 of the dilated pixels of the clear object texts when the value of the clear ink for the clear object text is computed below the range of visibility (constant threshold P) of clear ink value; or by decreasing pixel values K1 of the dilated pixels of the clear object texts when the value of the clear ink for the clear object text is computed above the range of visibility (constant threshold P) of clear ink value.

[Case 2]: When the Amount of Clear Flood Percentage is Greater than the Amount of the Clear for Clear Object Text

```
If Flood > ObjectClearText then
    Loop
        If ABS |Flood – ObjectClearText| < P
            ObjectClearText = ABS |Flood –
                ObjectClearText| – ObjectClearText;
        Else
            Break;
        EndIf
    EndLoop
EndIf
```

Thus, when the amount of the clear flood percentage is greater than the amount of the clear for the clear object text, it is further determined whether the amount of the flood percentage and the amount of clear for clear object text are ranging below the range of visibility (constant threshold P). Based on such determination, the pixel values of the dilated pixels of the clear object text in the input raster buffer are modified by decreasing pixel values of the dilated pixels of the clear object text.

[Case 3]: When the Amount of Clear Flood Percentage is Less than the Amount of the Clear for Clear Object

```
If Flood < ObjectClearText then
    Loop
        If ABS |Flood – ObjectClearText| < P
            ObjectClearText = ABS |Flood –
                ObjectClearText| + ObjectClearText;
        Else
            Break;
        EndIf
    EndLoop
EndIf
```

Thus, when the amount of the clear flood percentage is less than the amount of the clear for the clear object text, it is further determined whether the amount of the flood percentage and the amount of clear for clear object text are ranging below the range of visibility (constant threshold P). Based on such determination, the pixel values of the dilated pixels of the clear object text in the input raster buffer are modified by increasing pixel values of the dilated pixels of the clear object text.

The modified pixel values are then updated and stored in the raster buffer of the input image. The modified or updated raster buffer is then converted into a ready-to-print (RTP) format and made available to the network printer 104 for printing purposes.

Figure 3F:
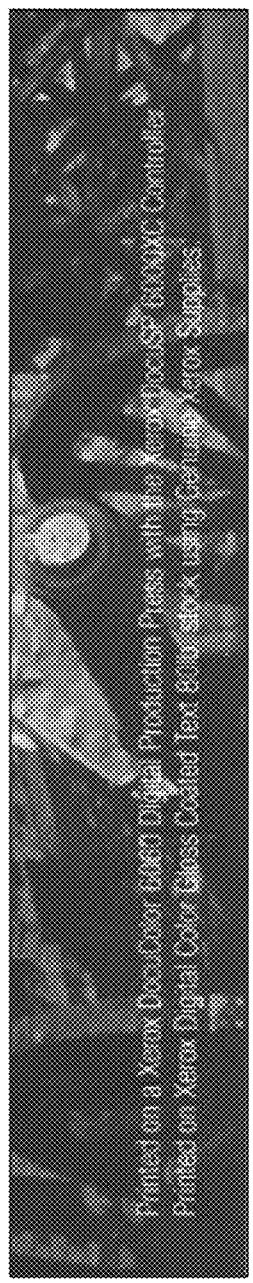
Figures 3G, 3H:
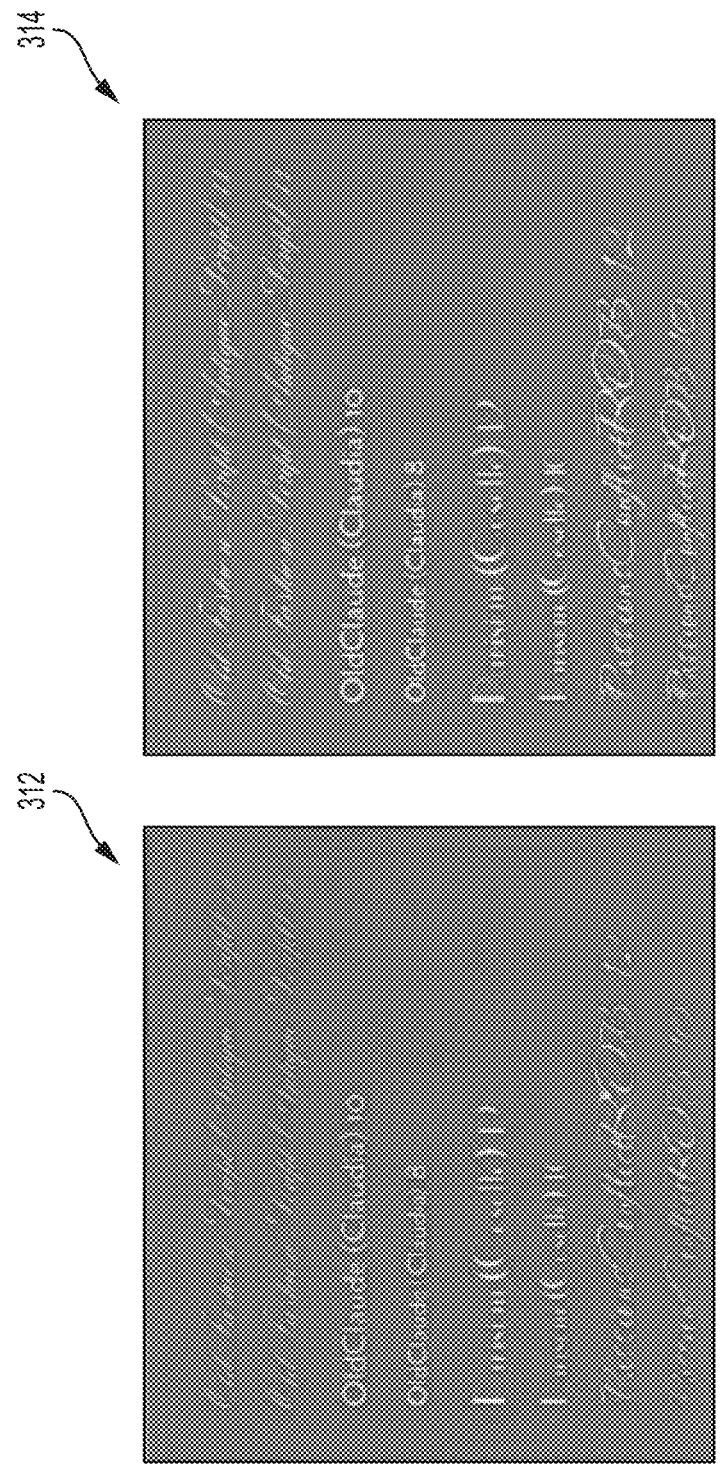

The effect of the above algorithms is shown in FIGS. 3B, 3D, 3F, and 3H. For example, in FIG. 3B, an output 302 of the above algorithm is shown. In the output 302, characters 'L' and 'C' are readable with flood clear applied on the same surface even though flood is applied on the entire plane. Similarly, in FIG. 3D, an output 306 of the above algorithm is shown. In the output 306, the small size text objects are clear and visible with the flood clear applied on the entire plane. FIG. 3F represents another output 310 of the above algorithm. In the output 310, the text objects become clear and visible with the flood clear applied on the entire plane. Further, FIG. 3H shows another output 314 of the existing techniques of flood clear applications. In the output 314, the text objects become clear and visible with the flood clear applied on the entire plane. As can be seen from FIGS. 3B, 3D, 3F, and 3H, the system(s) and method(s) described herein produce better or enhanced image quality for the clear text on clear planes. This in turn satisfies the user of the user device 102 as the user will be able to read clear objects with much better visibility.

Further, in an example, the working of the printing system 108 implemented in the printing environment 100, is described in more detail with reference to FIGS. 2, 3A-3H, 4, and 5A-5B.

Figure 2:
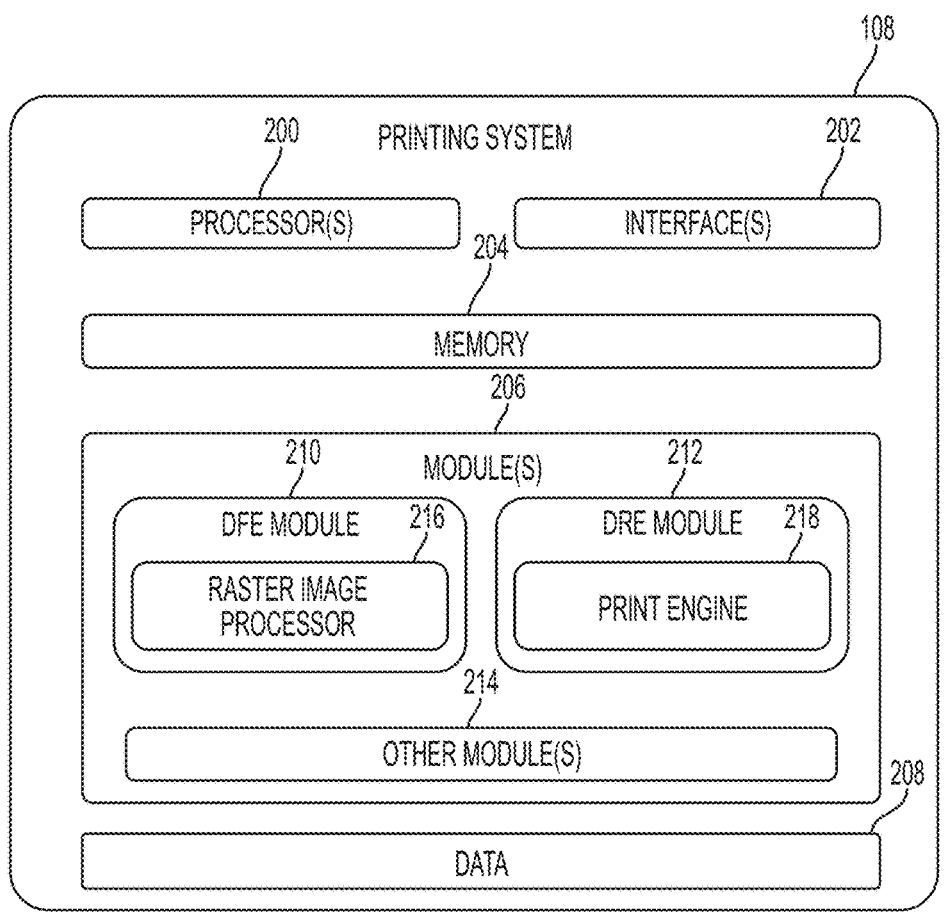
FIG. 2 illustrates a schematic of a printing system, according to an implementation of the present subject matter.

FIG. 2 illustrates various components of the printing system 108, in accordance with one example of the present subject matter. The printing system 108 may include a processor 200, an interface 202, and a memory 204. Further, the printing system 108 may include module(s) 206 and data 208.

The processor 200, amongst other capabilities, may be configured to fetch and execute computer-readable instructions stored in the memory 204. The processor 200 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as processor(s), may be provided through the use of dedicated hardware as well as hardware capable of executing software in association with appropriate software.

When provided by the processor 200, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 202 may include a variety of machine readable instructions-based interfaces and hardware interfaces that allow the printing system 108 to interact with different entities, such as the processor 200, the module(s) 206, and the data 208. Further, the interface(s) 202 may enable the components of the printing system 108 to communicate with other user segmenting systems, and external repositories. The interface 202 may facilitate multiple communications within a wide variety of networks and protocol types, including wireless networks, wireless Local Area Network (WLAN), RAN, satellite-based network, etc.

The memory 204 may be coupled to the processor 200 and may, among other capabilities, provide data and instructions for generating different requests. The memory 204 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 206 may include routines, programs, objects, components, data structures, and the like, which perform particular tasks or implement particular abstract data types. The module(s) 206 may further include modules that supplement applications on printing system 108. Further, the module(s) 206 can be implemented in hardware, instructions executed by the processor 200, or by a combination thereof.

In one example, the module(s) 206 may be machine-readable instructions (software) which, when executed by a processor/processing unit, perform any of the described functionalities. The machine-readable instructions may be stored on an electronic memory device, hard disk, optical disk, or other machine-readable storage medium, or non-transitory medium. In one further example, the machine-readable instructions can also be downloaded to the storage medium via a network connection.

The module(s) 206 may perform different functionalities which may include, but may not be limited to, receiving a print job including PDL file having an input image from the user device 102-2; performing raster image processing on the input image to generate input raster buffer by converting the input image into a digital bitmap image comprised of an array of pixels, wherein each pixel being assigned with an object tag information, and an object definition; determining clear objects based on the object tag information and the object definition; drawing a bounding box around each block of the clear objects, wherein pixels tagged as clear in the bounding box are considered as foreground pixels and rest pixels in the same bounding box are considered as background pixels; for each bounding box, computing occupancy percentage of the foreground pixels against the background pixels; applying dilation on the dilated pixels of the clear objects when the computed occupancy percentage is below a threshold value; tagging the foreground pixels, representing the clear objects, which are dilated as "dilated pixels" of the clear objects; determining an amount of flood clear selected for the application on the input image; for each of the dilated pixels and based on the amount of the flood clear, modifying pixel values of the dilated pixels of the clear objects in the input raster buffer to bring the dilated pixels in the range of visibility of clear ink value; converting the input raster buffer into a ready-to-print (RTP) format; and generating the print document at a MFD or at the printer 104 or at the printing system 108 based on the RTP format.

In one example implementation, the module(s) 206 may include a digital front end (DFE) module 210, a digital rear end (DRE) module 212, and other module(s) 214. Further, the DFE module 210 may include a raster image processor (RIP) 216, and the DRE module 212 may include a print engine 218.

Further, the data 208 serves, amongst other things, as a repository for storing data that may be fetched, processed, received, or generated by one or more of the module(s) 206. The data 208 may include intermediate processing data related to image processing.

In operation, while performing flattening, the DFE module 210 of the printing system 108 first identifies, using the raster image processor 216, text/graphic objects depending upon tag values or information from a given input raster buffer. Thereafter, the DFE module 210 defines or identifies the clear objects from amongst the text/graphic objects using the object definition embedded in the PDL file received from the user device 102. The DFE module 210 then provides or draws a bounding box for each block of clear objects. Now within each bounding box, the DFE module 210 computes occupancy percentage of foreground pixels (of the clear objects) against background pixels. If the computed occupancy percentage falls below a defined threshold value, then the foreground pixels associated with the clear objects is considered for application of dilation. Thus, the method described herein doesn't check the size of the clear objects; rather the method checks the occupancy percentage of the clear objects within a bounding box. With this, only intended and logically desired clear objects undergo for dilation.

Thereafter, after the application of dilation, pixel values associated with the clear objects are updated/modified based on the above disclosed algorithm and stored in the input raster buffer of the input image. The modified or updated input raster buffer is then converted into a ready-to-print (RTP) format and made available to the printer 104 for printing purposes by the print engine 218 of the DRE module 212.

In the above description, although the operation of the present subject matter is described in relation to the printing system 108, but the description is equally applicable or operation-able by any multifunctional device connected to the network 106. The multifunctional device can include the printer 104. Further, the printer 104 can also include the necessary modules for implementation of the present subject matter. For example, the printer 104 may include the digital front end (DFE) module 210 having the raster image processor (RIP) 216 and a digital rear end (DRE) module 212 having the print engine 218.

FIG. 4 illustrates an example computing environment using a non-transitory computer readable medium 402 for operation of the printing system 108 or the printer 104, according to an example implementation of the present subject matter. The computing environment may be a public computing environment or a private computing environment. In one example, the computing environment includes a processing resource 404 communicatively coupled to the non-transitory computer readable medium 402 through a communication link 406.

For example, the processing resource 404 can be a processor, such as a control device of the printing system 108 or the printer 104. The non-transitory computer readable medium 402 can be, for example, an internal memory device or an external memory device. In one example, the communication link 406 may be a direct communication link, such as one formed through a memory read/write interface. In another example, the communication link 406 may be an indirect communication link, such as one formed through a network interface. In such a case, the processing resource 404 can access the non-transitory computer readable medium 402 through a network 408. The network 408 may be a single network or a combination of multiple networks and may use a variety of communication protocols.

The processing resource 404 and the non-transitory computer readable medium 402 may also be communicatively coupled to data sources 410 over the network 408. The data sources 410 can include, for example, databases and computing devices. The data sources 410 may be used by the database administrators and other users to communicate with the processing resource 404.

In one example, the non-transitory computer readable medium 402 can include a set of computer readable instructions, such as a digital front end (DFE) module and a digital rear end (DRE) module. The set of computer readable instructions, referred to as instructions hereinafter, can be accessed by the processing resource 404 through the communication link 406 and subsequently executed to perform acts for network service insertion. In other words, during operation, the processing resource 404 can execute the DFE module 210 and DRE module 212.

On execution by the processing resource 404, the DFE module 210 can receive a print job in the form of page description language (PDL) file having input image. The PDL file may include information about various objects, say, characters, words, text, graphics, photos, and the like, contained in the input image present in the PDL file. The information may describe the appearance of the objects present within the input image, and may include a set of programming language commands for processing the input image based on the information. In one example, the PDL file may include object definition defining the objects as clear objects based on user selection and general information on how to process the input image based on the clear object defined in PDL file.

Further, based on the commands and information present or stored in the PDL file, the DFE module 210 decomposes the PDL file to determine whether any object in the input image is selected by a user for application of object clear, followed by determining whether flood clear feature is selected by the user. Following the two conditional determination, the DFE module 210 performs raster image processing on the input image present in the PDL file. The raster image processing is a process of converting the input image into one or more digital bitmap images, rasterizing pixel data of the bitmap images into pixel values, and arranging the pixel values in an input raster buffer in raster format. Example of the raster format may include, but not limited to, JPEG, TIFF, RAW, PNG, GIF, BMP, PPM, PGM, PBM, XBM, ILBM, WBMP, and PNM.

In an example, each pixel comprised in the digital bitmap image is assigned with object tag information and object definition present in the PDL file. For example, the object tag information may determine or define an object type associated with a particular pixel. Examples of the object types may include text, image, or graphics. Further, the object definition from the PDL file defines which object types are selected by the user as the clear objects.

Based on object tag information and object definition, the DFE module 210 determines the clear objects in the input mage and draws a bounding box around each block of the clear objects. In an example, the bounding box is a smallest square or rectangular box in which a group of the texts or characters can be accumulated.

Further, pixels tagged as clear in the bounding box are considered as foreground pixels and rest pixels in the same bounding box are considered as background pixels. For each bounding box, the occupancy percentage of the foreground pixels is computed against the background pixels by the DFE module 210. If the computed occupancy percentage of a single bounding box falls below a threshold value, then the clear object, representing text or graphic, is considered for application of dilation morphological operation. In an example, the threshold value associated with occupancy percentage is generally taken as 15; however the user can adjust or modify this threshold value at the time of submission of the print job.

Thereafter, the clear objects considered for dilation are subjected to the dilation morphological operation by the DFE module 210. In dilation morphological operation, the selected object is made bigger, wider, larger, or more open. After application of the dilation morphological operation, the pixels associated with the dilated clear objects are assigned with a different tag of "dilated pixels" of clear tagged objects.

In an alternate (optional) example, in case the computed occupancy percentage falls below the threshold value during determination, then the extreme and the second extreme edge pixels of the clear tagged objects can be considered as the "dilated pixels" of the clear objects.

Once the pixels in the clear objects are tagged or considered as the dilated pixels, an amount of clear flood percentage applied on the input image is determined, followed by determination of an amount of the clear for the clear object. Based on the determination of the amount of clear flood percentage and the amount of the clear, the DFE module 210 executes the above mentioned algorithms to enhance the quality of the underlying clear objects in the input image.

Thereafter, pixel values associated with the dilated pixels of the clear objects are updated/modified based on the above disclosed algorithm and stored in the input raster buffer of the input image using the DRE module 212. The modified or updated input raster buffer is then converted into a ready-to-print (RTP) format and made available to the network printer 104 for printing purposes by the DRE module 212.

Thus, with the implementation of the present subject matter, the effect of the above mentioned algorithm is shown in FIGS. 3B, 3D, 3F, and 3H. As can be seen from these figures, the system(s) and method(s) described herein produce better or enhanced image quality for the clear text on clear planes in comparison to conventional print outs shown in FIGS. 3A, 3C, 3E, and 3G. This in turn satisfies the user as the user will be able to read clear objects with much better visibility.

Figure 5A:
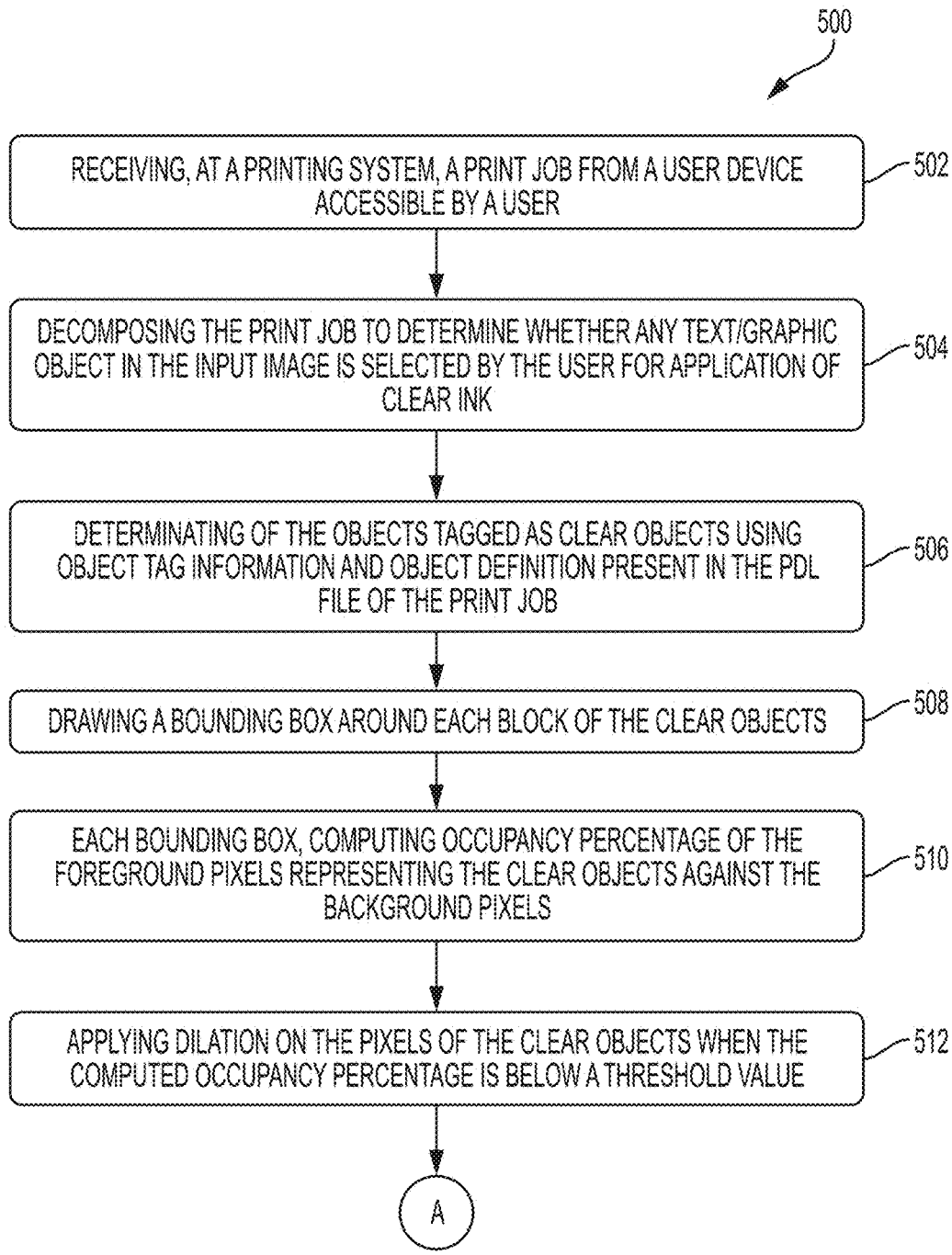
FIGS. 5A-5B illustrate a method for operating a multi-functional device, according to an implementation of the present subject matter.
Figure 5B:
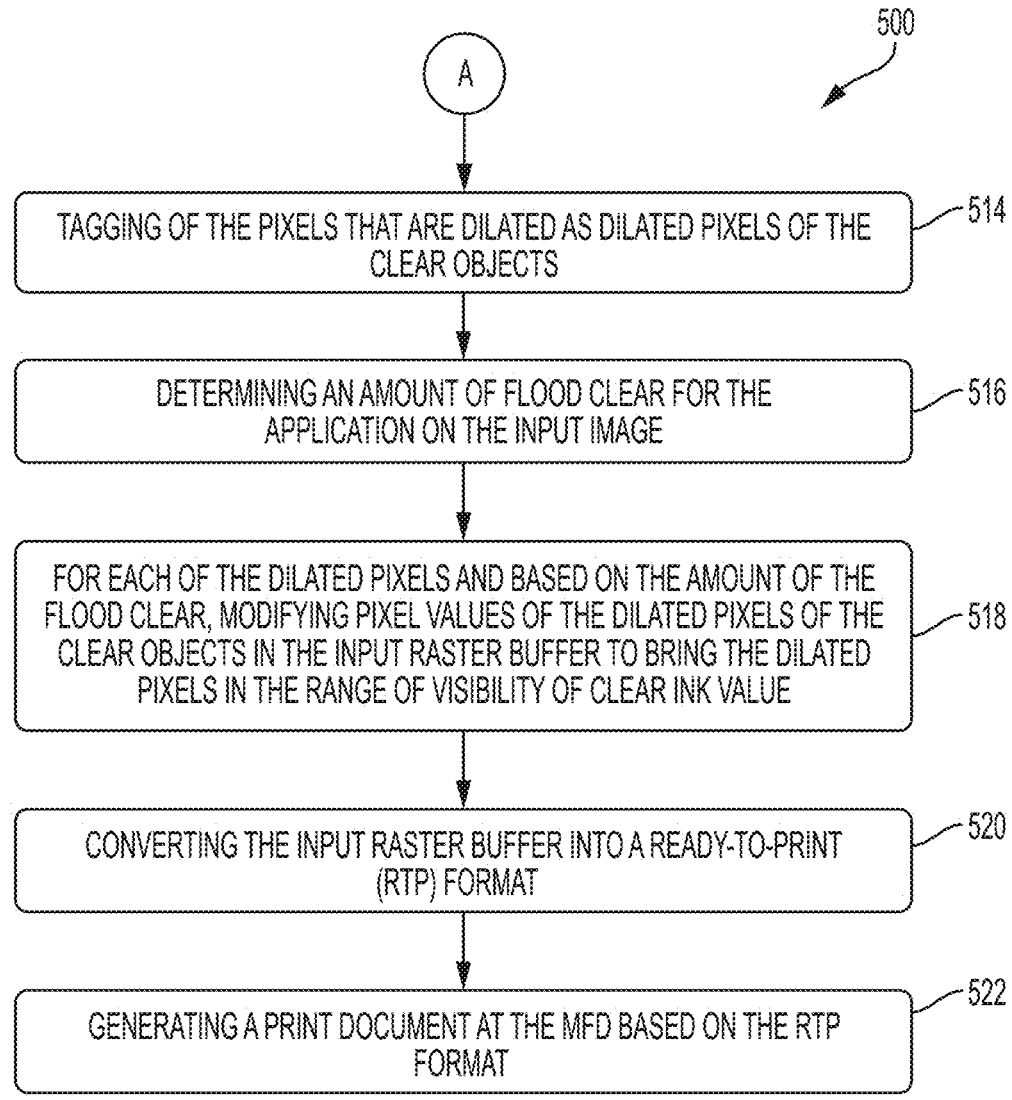

Method 500 is described in FIGS. 5A and 5B for operating a multifunctional device (MFD) such as the printer 104, according to an example of the present subject matter. The order in which the method 500 is described is not intended to be construed as a limitation, and any number of the described method blocks can be combined in any appropriate order to carry out the method 500 or an alternative method. Additionally, individual blocks may be deleted from the method 500 without departing from the scope of the subject matter described herein.

The method 500 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIGS. 5A and 5B, the method 500 may be performed by a processing device, such as a processor of the MFD such as the printer 104.

At block 502, the MFD receives a print job from a user device, say user device 102-2. The print job is received in the form of page description language (PDL) file having an input image. The PDL file may include information about various objects, say, characters, words, text, graphics, photos, and the like, contained in the input image present in the PDL file. The information may describe the appearance of the objects present within the input image, and may include a set of programming language commands for processing the input image based on the information. In one example, the PDL file may include object definition defining the objects as clear objects based on user selection and general information on how to process the input image based on the clear object defined in PDL file.

At block 504, based on the commands and information stored in PDL file, the PDL file is decomposed to determine whether any text/graphic object in the input image is selected by the user for application of clear ink, followed with determining whether the entire input image is selected by the user for the application of flood clear feature. In case both the conditions are affirmatively determined, raster image processing is performed on the input image to generate input raster buffer by converting the input image into a digital bitmap image comprised of an array of pixels, wherein each pixel being assigned with an object tag information and an object definition.

At block 506, the method includes determination of the clear objects based on the object tag information and the object definition present in the PDL file of the print job.

At block 508, the method includes drawing a bounding box around each block of the clear objects, wherein pixels tagged as clear in the bounding box are considered as foreground pixels and rest pixels in the same bounding box are considered as background pixels.

At block 510, for each bounding box, the method computes occupancy percentage of the foreground pixels representing the clear objects against the background pixels.

At block 512, the method includes applying dilation on the pixels of the clear objects when the computed occupancy percentage is below a threshold value.

At block 514, the method includes tagging of the pixels, representing the clear objects, which are dilated as "dilated pixels" of the clear objects.

At block 516, an amount of flood clear is determined for the application on the input image.

At block 518, for each of the dilated pixels and based on the amount of the flood clear, the method includes modifying pixel values of the dilated pixels of the clear objects in the input raster buffer to bring the dilated pixels in the range of visibility of clear ink value.

At block 520, the method includes converting the input raster buffer into a ready-to-print (RTP) format.

At block 522, the method includes generating a print document at the MFD based on the RTP format.

Thus, with the implementation of the present subject matter, the effect of the above mentioned algorithm is shown in FIGS. 3B, 3D, 3F, and 3H. As can be seen from these figures, the system(s) and method(s) described herein produce better or enhanced image quality for the clear text on clear planes in comparison to conventional print outs shown in FIGS. 3A, 3C, 3E, and 3G. This in turn satisfies the user as the user will be able to read clear objects with much better visibility.

Further, the present subject matter is disclosed herein with reference to a image processing architecture; however, the subject matter is equally applicable to printing systems implemented in multi-functional devices, such as printers, copiers, and the like, which are in direct communication with the user devices. In addition to the printing systems, the disclosure can be implemented for any image rendering devices such as TV, monitor screen or the like. For the sake of discussion, the disclosure is discussed with the help of printing device or systems as an example without any limitation.

For a person skilled in the art, it is understood that the use of phrase(s) "is," "are," "may," "can," "could," "will," "should," or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the disclosure, numerous references may be made regarding servers, services, schemes, engines, modules, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing," or "determining," or "drawing," or "applying," or "tagging," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for printing clear tagged objects on clear plane, the method being implemented in a multifunctional device (MFD) having processor, the method comprising:
   receiving a print job at the MFD, wherein the print job comprising a page description language (PDL) file having an input image;
   performing raster image processing on the input image to generate input raster buffer by converting the input image into a digital bitmap image comprised of an array of pixels, wherein each pixel being assigned with an object tag information and an object definition;
   determining clear objects based on the object tag information and the object definition present in the PDL file;
   drawing a bounding box around each block of the clear objects, wherein pixels tagged as clear objects in the bounding box are considered as foreground pixels and rest pixels in the same bounding box are considered as background pixels;
   for each bounding box, computing occupancy percentage of the foreground pixels representing the clear objects against the background pixels;
   applying dilation on the pixels representing the clear objects when the computed occupancy percentage is below a threshold value;
   tagging the pixels, representing the clear objects, which are dilated as dilated pixels of the clear objects;
   determining an amount of flood clear selected for the application on the input image;
   for each of the dilated pixels and based on the amount of the flood clear, modifying pixel values of the dilated pixels of the clear objects in the input raster buffer to bring the dilated pixels in the range of visibility of clear ink value;
   converting the input raster buffer into a ready-to-print (RTP) format; and
   generating a print document at the MFD based on the RTP format.

2. The method as claimed in claim 1, wherein when the computed occupancy percentage is above the threshold value, tagging the extreme and the second extreme edge pixels of the clear objects as dilated pixels of the clear objects.

3. The method as claimed in claim 1, wherein the threshold value is 15.

4. The method as claimed in claim 1, wherein before drawing the bounding box, determining whether a clear flood feature is enabled by a user of a user device.

5. The method as claimed in claim 1, wherein the receiving comprising receiving the print job in a PDL file from a user device.

6. The method as claimed in claim 1, wherein the modifying pixel values of the dilated pixels of the clear objects in the input raster buffer comprising:
   determining an amount of clear flood percentage applied on the input image; and
   further determining an amount of the clear for the clear object.

7. The method as claimed in claim 6, wherein when the amount of the clear flood percentage is equal to the amount of the clear for the clear object, the modifying pixel values of the dilated pixels of the clear objects in the input raster buffer comprising:
   increasing pixel values of the dilated pixels of the clear objects when the amount of the clear for the clear object is computed below the range of visibility of clear ink value; or
   decreasing pixel values of the dilated pixels of the clear objects when the amount of the clear for the clear object is computed above the range of visibility of clear ink value.

8. The method as claimed in claim 6, wherein when the amount of the clear flood percentage is less than the amount of the clear for the clear object, the modifying pixel values of the dilated pixels of the clear objects in the input raster buffer comprising increasing pixel values of the dilated pixels of the clear objects.

9. The method as claimed in claim 6, wherein when the amount of the clear flood percentage is greater than the amount of the clear for the clear object, the modifying pixel values of the dilated pixels of the clear objects in the input raster buffer comprising decreasing pixel values of the dilated pixels of the clear objects.

10. The method as claimed in claim 1 further comprising allowing a user of a user device to control value of the threshold value.

11. A multifunctional device (MFD) for printing clear tagged objects on clear plane, comprising:
a processor;
a digital front end (DFE) module, coupled to the processor, to:
receive a print job at the MFD, wherein the print job comprising a page description language (PDL) file having an input image;
perform raster image processing on the input image to generate input raster buffer by converting the input image into a digital bitmap image comprised of an array of pixels, wherein each pixel being assigned with an object tag information and an object definition;
determine clear objects based on the object tag information and the object definition present in the PDF file;
draw a bounding box around each block of the clear objects, wherein pixels tagged as clear objects in the bounding box are considered as foreground pixels and rest pixels in the same bounding box are considered as background pixels;
for each bounding box, compute occupancy percentage of the foreground pixels representing the clear objects against the background pixels;
apply dilation on the pixels representing the clear objects when the computed occupancy percentage is below a threshold value;
tag the pixels, representing the clear objects, which are dilated as dilated pixels of the clear objects;
determine an amount of flood clear selected for the application on the input image;
for each of the dilated pixels and based on the amount of the flood clear, modify pixel values of the dilated pixels of the clear objects in the input raster buffer to bring the dilated pixels in the range of visibility of clear ink value; and
a digital rear end (DRE) module, coupled to the processor, to convert the input raster buffer into a ready-to-print (RTP) format and generate a print document at the MFD based on the RTP format.

12. The multifunctional device as claimed in claim 11, wherein when the computed occupancy percentage is above the threshold value, the DFE module tags the extreme and the second extreme edge pixels of the clear objects as dilated pixels of the clear objects.

13. The multifunctional device as claimed in claim 11, wherein the threshold value is 15.

14. The multifunctional device as claimed in claim 11, wherein before drawing the bounding box, the DFE module determines whether a clear flood feature is enabled by a user of a user device.

15. The multifunctional device as claimed in claim 11, wherein the DFE module modifies pixel values of the dilated pixels of the clear objects in the input raster buffer, by:
determining an amount of clear flood percentage applied on the input image; and
further determining an amount of the clear for the clear object.

16. The multifunctional device as claimed in claim 15, wherein when the amount of the clear flood percentage is equal to the amount of the clear for the clear object, the DFE module modifies pixel values of the dilated pixels of the clear objects in the input raster buffer, by:
increasing pixel values of the dilated pixels of the clear objects when the amount of the clear for the clear object is computed below the range of visibility of clear ink value; or
decreasing pixel values of the dilated pixels of the clear objects when the amount of the clear for the clear object is computed above the range of visibility of clear ink value.

17. The multifunctional device as claimed in claim 15, wherein when the amount of the clear flood percentage is less than the amount of the clear for the clear object, the DFE module modifies pixel values of the dilated pixels of the clear objects in the input raster buffer by increasing pixel values of the dilated pixels of the clear objects.

18. The multifunctional device as claimed in claim 15, wherein when the amount of the clear flood percentage is greater than the amount of the clear for the clear object, the DFE module modifies pixel values of the dilated pixels of the clear objects in the input raster buffer by decreasing pixel values of the dilated pixels of the clear objects.

19. The multifunctional device as claimed in claim 11, wherein the DFE module allows a user of a user device to control value of the threshold value.

20. A non-transitory computer-readable medium comprising instructions executable by a processing resource to:
receive a print job at a multifunctional device (MFD), wherein the print job comprising a page description language (PDL) file having an input image;
perform raster image processing on the input image to generate input raster buffer by converting the input image into a digital bitmap image comprised of an array of pixels, wherein each pixel being assigned with an object tag information and an object definition;
determine foreground pixels representing clear objects based on the object tag information and the object definition present in the PDL file;
draw a bounding box around each block of the clear objects, wherein pixels tagged as clear objects in the bounding box are considered as foreground pixels and rest pixels in the same bounding box are considered as background pixels;
for each bounding box, compute occupancy percentage of the foreground pixels representing the clear objects against the background pixels;
apply dilation on the pixels representing the clear objects when the computed occupancy percentage is below a threshold value;
tag the pixels, representing the clear objects, which are dilated as dilated pixels of the clear objects;
determine an amount of flood clear selected for the application on the input image;
for each of the dilated pixels and based on the amount of the flood clear, modify pixel values of the dilated pixels of the clear objects in the input raster buffer to bring the dilated pixels in the range of visibility of clear ink value;
convert the input raster buffer into a ready-to-print (RTP) format; and
generate a print document at the MFD based on the RTP format.

21. The non-transitory computer-readable medium of claim 20 comprising instructions executable by the processing resource to:
receive the print job in a PDL file from a user device.

22. The non-transitory computer-readable medium of claim 20 comprising instructions executable by the processing resource to:

tag the extreme and the second extreme edge pixels of the clear objects as dilated pixels of the clear objects, when the computed occupancy percentage is above the threshold value.

23. The non-transitory computer-readable medium of claim 20 comprising instructions executable by the processing resource to:
determine whether a clear flood feature is enabled by a user of a user device, before drawing the bounding box.

24. The non-transitory computer-readable medium of claim 20 comprising instructions executable by the processing resource to:
determine an amount of clear flood percentage applied on the input image; and
further determine an amount of the clear for the clear object.

25. The non-transitory computer-readable medium of claim 24 comprising instructions executable by the processing resource to:
increase pixel values of the dilated pixels of the clear objects when the amount of the clear for the clear object is computed below the range of visibility of clear ink value; and
decrease pixel values of the dilated pixels of the clear objects when the amount of the clear for the clear object is computed above the range of visibility of clear ink value.

26. The non-transitory computer-readable medium of claim 24 comprising instructions executable by the processing resource to:
modify pixel values of the dilated pixels of the clear objects in the input raster buffer by increasing pixel values of the dilated pixels of the clear objects, when the amount of the clear flood percentage is less than the amount of the clear for the clear object.

27. The non-transitory computer-readable medium of claim 24 comprising instructions executable by the processing resource to:
modify pixel values of the dilated pixels of the clear objects in the input raster buffer by decreasing pixel values of the dilated pixels of the clear objects, when the amount of the clear flood percentage is greater than the amount of the clear for the clear object.

* * * * *